(12) United States Patent
Fujiwara et al.

(10) Patent No.: US 9,291,524 B2
(45) Date of Patent: Mar. 22, 2016

(54) OPERATION DATA COLLECTION DEVICE FOR CONSTRUCTION MACHINES

(71) Applicant: HITACHI CONSTRUCTION MACHINERY CO., LTD., Tokyo (JP)

(72) Inventors: Junsuke Fujiwara, Tokyo (JP); Hideaki Suzuki, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/359,307

(22) PCT Filed: Nov. 20, 2012

(86) PCT No.: PCT/JP2012/080039
§ 371 (c)(1),
(2) Date: May 20, 2014

(87) PCT Pub. No.: WO2013/077309
PCT Pub. Date: May 30, 2013

(65) Prior Publication Data
US 2014/0288768 A1  Sep. 25, 2014

(30) Foreign Application Priority Data

Nov. 21, 2011 (JP) ................................ 2011-254244

(51) Int. Cl.
*G01M 17/00* (2006.01)
*G01M 15/09* (2006.01)
*E02F 9/22* (2006.01)
*E02F 9/26* (2006.01)
*G07C 5/00* (2006.01)

(52) U.S. Cl.
CPC ............... *G01M 15/09* (2013.01); *E02F 9/226* (2013.01); *E02F 9/2285* (2013.01); *E02F 9/2292* (2013.01); *E02F 9/2296* (2013.01); *E02F 9/267* (2013.01); *G07C 5/008* (2013.01)

(58) Field of Classification Search
CPC .................................. G07C 5/085; G07C 5/08
See application file for complete search history.

(56) References Cited

U.S. PATENT DOCUMENTS

2003/0061008 A1* 3/2003 Smith et al. ................... 702/188

FOREIGN PATENT DOCUMENTS

| JP | 2004-199501 A | 7/2004 |
| JP | 2005-163754 A | 6/2005 |
| JP | 2005-179929 A | 7/2005 |
| JP | 2005-180225 A | 7/2005 |

OTHER PUBLICATIONS

International Preliminary Report on Patentability received in International Application No. PCT/JP2012/080039 dated Jun. 5, 2014.

* cited by examiner

*Primary Examiner* — Michael D Lang
(74) *Attorney, Agent, or Firm* — Mattingly & Malur, PC

(57) ABSTRACT

Provided is an operation data collection device for construction machines that is capable of efficiently collecting operation data indicative of impending failure of a construction machine by reducing the amount of information to be collected and stored without degrading the quality of information used for maintenance. The device receives operation data containing values measured by a plurality of sensors, a value indicating the operating status and an operation data storage section. The device includes a normal reference value storage section that stores a normal reference value for each of the sensors generating the operation data, a deviation calculation section that calculates the deviation of each of the sensors from the normal reference value, and a stored sensor item extraction section that extracts sensor items of operation data to be stored in the operation data storage section in accordance with the calculated deviation of each sensor.

12 Claims, 9 Drawing Sheets

[EXEMPLARY CONFIGURATION OF SENSOR DATA]

| RECEPTION DATE AND TIME |
|---|
| COMPONENT SYSTEM ID, SENSOR ID, SENSOR VALUE |
| COMPONENT SYSTEM ID, SENSOR ID, SENSOR VALUE |
| ... |

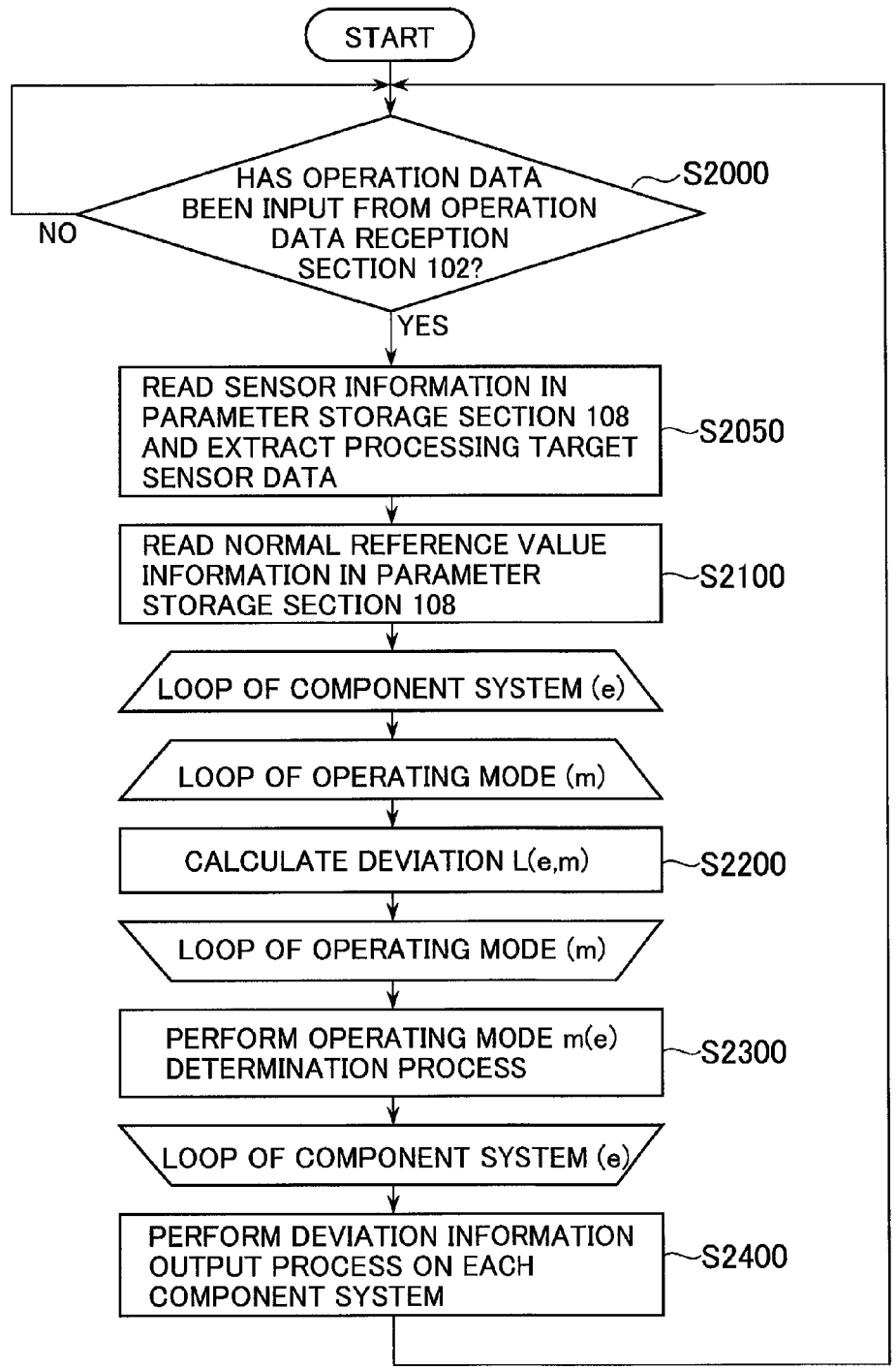

FIG. 8

[SENSOR INFORMATION IN PARAMETER STORAGE SECTION 108]

| COMPONENT SYSTEM (ID) | SENSOR (ID) | ACQUIRED DATA |
|---|---|---|
| ENGINE INTAKE SYSTEM (1) | INTER-COOLER INLET TEMPERATURE SENSOR (T1) | INTER-COOLER INLET TEMPERATURE [°C] |
| | INTER-COOLER INLET PRESSURE SENSOR (P1) | INTER-COOLER INLET PRESSURE [kPa] |
| | INTER-COOLER OUTLET TEMPERATURE SENSOR (T2) | INTER-COOLER OUTLET TEMPERATURE [°C] |
| | INTER-COOLER OUTLET PRESSURE SENSOR (P2) | INTER-COOLER OUTLET PRESSURE [kPa] |
| ENGINE EXHAUST SYSTEM (2) | EXHAUST TEMPERATURE SENSOR (T3) | EXHAUST TEMPERATURE [°C] |
| ENGINE COOLING WATER SYSTEM (3) | RADIATOR INLET TEMPERATURE SENSOR (T4) | RADIATOR INLET TEMPERATURE [°C] |
| | RADIATOR INLET PRESSURE SENSOR (P4) | RADIATOR INLET PRESSURE [kPa] |
| | RADIATOR OUTLET TEMPERATURE SENSOR (T5) | RADIATOR OUTLET TEMPERATURE [°C] |
| | RADIATOR FRONT AIR TEMPERATURE SENSOR (T6) | RADIATOR FRONT AIR TEMPERATURE [°C] |
| | FAN DRIVE MOTOR INLET PRESSURE SENSOR (P6) | FAN MOTOR INLET PRESSURE [MPa] |
| HYDRAULIC FLUID COOLING SYSTEM (4) | OIL COOLER INLET PRESSURE SENSOR (P7) | OIL COOLER INLET PRESSURE [MPa] |
| | OIL COOLER FAN MOTOR INLET PRESSURE SENSOR (P8) | FAN DRIVE MOTOR INLET PRESSURE [MPa] |
| | OIL COOLER FAN MOTOR DRAIN TEMPERATURE SENSOR (T9) | FAN DRIVE MOTOR DRAIN TEMPERATURE [°C] |
| | OIL COOLER FAN MOTOR DRAIN PRESSURE SENSOR (P9) | FAN DRIVE MOTOR DRAIN PRESSURE [MPa] |
| | HYDRAULIC FLUID TEMPERATURE SENSOR (T10) | HYDRAULIC FLUID TEMPERATURE [°C] |
| COMPONENT SYSTEM e | OIL COOLER FRONT TEMPERATURE SENSOR (T11) | OIL COOLER FRONT TEMPERATURE [°C] |
| ..... | | |
| COMPONENT SYSTEM E | OIL COOLER OUTLET TEMPERATURE SENSOR (T12) | OIL COOLER OUTLET TEMPERATURE [°C] |

[NORMAL REFERENCE VALUES IN PARAMETER STORAGE SECTION 108]

[PROCESSING FLOWCHART OF SENSOR WITH TOP GREATEST DEVIATION DETERMINATION AND EXTRACTION SECTION 110]

FIG. 11
[DETERMINATION THRESHOLD VALUE INFORMATION IN PARAMETER STORAGE SECTION 108]

| RANGE OF DEVIATION L | NUMBER SENSORS WITH TOP GREATEST DEVIATION TO BE EXTRACTED |
|---|---|
| $0 \leq L < 1$ | 0 |
| $1 \leq L < 2$ | 2 |
| $2 \leq L < 3$ | 4 |
| $3 \leq L$ | 6 |

FIG. 12
[OPERATION DATA STORAGE SECTION 106]

| ITEM | DESCRIPTION |
|---|---|
| MANAGEMENT INFORMATION | MODEL NUMBER |
| | UNIT NUMBER |
| | PIN |
| | COUNTRY CODE |
| | SITE ID |
| SENSOR DATA | DATA AT TIME t |
| | DATA AT TIME t+1 |
| | DATA AT TIME t+2 |
| | ⋮ |

| RECEPTION DATE AND TIME |
|---|
| ENGINE INTAKE SYSTEM |
| ENGINE EXHAUST SYSTEM |
| ENGINE COOLING WATER SYSTEM |
| HYDRAULIC FLUID COOLING SYSTEM |
| ⋮ |
| COMPONENT SYSTEM e |
| ⋮ |
| COMPONENT SYSTEM E |

| |
|---|
| COMPONENT SYSTEM ID |
| DEVIATION: L |
| NUMBER OF SENSORS WITH TOP GREATEST DEVIATION: NUM |
| SENSOR ID AND SENSOR VALUE OF SENSOR EXHIBITING GREATEST DEVIATION |
| SENSOR ID AND SENSOR VALUE OF SENSOR EXHIBITING SECOND GREATEST DEVIATION |
| ⋮ |
| SENSOR ID AND SENSOR VALUE OF SENSOR EXHIBITING NUM GREATEST DEVIATION |

OPERATION DATA COLLECTION DEVICE FOR CONSTRUCTION MACHINES

TECHNICAL FIELD

The present invention relates to an operation data collection device for construction machines, and more specifically, to an operation data collection device for construction machines that is capable of efficiently collecting operation data indicative of impending failure of a construction machine.

BACKGROUND ART

In the field of construction machines, several-hundred-ton class, extra-large heavy machines, such extra-large hydraulic excavators, are operating throughout the world for earth excavation in a large mine. It is demanded that these extra-large heavy machines operate continuously in order to improve productivity in ore mining. An operation data collection device is mounted in the extra-large heavy machines to collect detailed operation data for the purpose of preventing a failure that obstructs such continuous operations.

A hydraulic fluid cooling system failure diagnostic device for construction machines that is described in Patent Document 1 permits anyone to readily identify the cause of an overheat without the experience and skill of a service technician when, for instance, hydraulic fluid is overheated in a hydraulic fluid cooling system for operating a heavy machine. The hydraulic fluid cooling system failure diagnostic device performs constant monitoring by way of comparing specific sensor data received from the heavy machine against a determination threshold value. Whenever the sensor data is outside a normal range, the hydraulic fluid cooling system failure diagnostic device records the sensor data and a plurality of other relevant sensor data.

PRIOR ART LITERATURE

Patent Document

Patent Document 1: JP-2005-179929-A

SUMMARY OF THE INVENTION

Problems to be Solved by the Invention

When the aforementioned extra-large heavy machines are used, the operating status of a plurality of systems, such as a hydraulic fluid cooling system, an engine cooling water system, and an engine intake/exhaust system, needs to be minutely confirmed for the purpose of preventing an accident. To minutely confirm the operating status, it is necessary to install a large number of sensors in engine and hydraulic systems and collect a wide variety of sensor data.

The rise in the number of installed sensors, however, requires it to prepare a large-size storage device for storing sensor data from various sensors. It further increases sensor items to be preregistered in order to monitor for a wide variety of abnormalities, resulting in an enormous amount of information to be stored because of the data being acquired at short time intervals.

The hydraulic fluid cooling system failure diagnostic device described in Patent Document 1 performs constant monitoring through comparing only a value detected by a hydraulic fluid temperature sensor against a threshold value and records the other relevant sensor data in the event of an overheat. This device at the same time does not constantly monitor the other relevant sensor data. As a result, the amount of information to be stored decreases; however, the device is not able to handle an impending failure indicated by the other relevant sensor data. Consequently, the device could fail to prevent a failure of a heavy machine.

As such being the case, demanded is an operation data collection device that reduces the amount of information to be stored in a storage device and collects and stores only data useful for the maintenance of a heavy machine even in a situation where there are many pieces of detailed operation data.

The present invention has been made in view of the above circumstances. An object of the present invention is to provide an operation data collection device for construction machines that is capable of efficiently collecting operation data indicative of an impending failure of a construction machine by reducing the amount of information to be collected and stored and without degrading the quality of information used for maintenance.

Means for Solving the Problems

In accomplishing the above object, according to a first aspect of the present invention, there is provided an operation data collection device for construction machines that is mounted on a construction machine to receive operation data containing values measured by a plurality of sensors, the data indicating the operating status of the construction machine. The device further stores the operation data in an operation data storage section. The operation data collection device includes a normal reference value storage section, a deviation calculation section, and a stored sensor item extraction section. The normal reference value storage section stores a normal reference value for each of the sensors generating the operation data. The deviation calculation section calculates the deviation of each of the sensors from the normal reference value. The stored sensor item extraction section extracts sensor items of operation data to be stored in the operation data storage section in accordance with the deviation of each sensor, which is calculated by the deviation calculation section.

According to a second aspect of the present invention, there is provided the operation data collection device as described in the first aspect, wherein the stored sensor item extraction section compares the deviation of each of the sensors from the normal reference value, sequentially selects the sensors from the sensor items in the order from the greatest deviation to the smallest, and stores information on the selected sensors in the operation data storage section.

According to a third aspect of the present invention, there is provided the operation data collection device as described in the first or second aspect, wherein the average and variance of values acquired by the sensors are used as the normal reference value in the normal reference value storage section.

According to a fourth aspect of the present invention, there is provided the operation data collection device as described in the second or third aspect, wherein the deviation calculation section calculates a deviation aggregate of each of sensor assemblies classified in accordance with sensor properties by use of the deviation of each sensor. The section includes a sensor item count determination threshold value storage section for storing sensor item count determination threshold value information indicative of the relationship between the deviation aggregate of each of the sensor assemblies and the number of sensor items of operation data to be selected by the stored sensor item extraction section and stored in the operation data storage section. The stored sensor item extraction section determines the number of sensor items of the operation data to be stored in the operation data storage section in accordance with the sensor item count determination threshold value information and with the deviation aggregate of each of the sensor assemblies.

According to a fifth aspect of the present invention, there is provided the operation data collection device as described in the fourth aspect, wherein the deviation calculation section classifies the sensor assemblies, which are the units for calculating the deviation aggregate, according to a component on which the sensors are mounted or a system to which the sensors belong.

According to a sixth aspect of the present invention, there is provided the operation data collection device as described in the fifth aspect, wherein the deviation calculation section classifies the sensor assemblies, which are the units for calculating the deviation aggregate, according to a component system; and wherein the component system includes at least one of an engine cooling water system, an engine intake system, an engine exhaust system, an engine oil system, and a hydraulic fluid cooling system.

According to a seventh aspect of the present invention, there is provided the operation data collection device as described in the sixth aspect, wherein a sensor assembly whose component system is the engine cooling water system includes an inter-cooler inlet temperature sensor, an inter-cooler inlet pressure sensor, an inter-cooler outlet temperature sensor, and an inter-cooler outlet pressure sensor.

According to an eighth aspect of the present invention, there is provided the operation data collection device as described in the sixth aspect, wherein a sensor assembly whose component system is the hydraulic fluid cooling system includes an oil cooler inlet pressure sensor, an oil fan motor inlet pressure sensor, an oil cooler fan motor drain temperature sensor, an oil cooler fan motor drain pressure sensor, a hydraulic fluid temperature sensor, an oil cooler front temperature sensor, and an oil cooler outlet temperature sensor.

According to a ninth aspect of the present invention, there is provided the operation data collection device as described in the sixth aspect, wherein a sensor assembly whose component system is the engine cooling water system includes a radiator inlet temperature sensor, a radiator inlet pressure sensor, a radiator outlet temperature sensor, a radiator front air temperature sensor, and a fan drive motor inlet pressure sensor.

Advantage

The present invention is capable of efficiently collecting operation data indicative of an impending failure of a construction machine because it reduces the amount of information to be collected and stored while maintaining the quality of information used for maintenance. This makes it possible to precisely prevent a failure that obstructs continuous operations. This results in an increase in the productivity of the construction machine.

BRIEF DESCRIPTION OF DRAWINGS

FIG. 7 is a flowchart illustrating a process performed by a deviation calculation section according to the embodiment of the operation data collection device of the present invention.

FIG. 8 is a table illustrating an example of sensor information retained by a parameter storage section according to the embodiment of the operation data collection device of the present invention.

FIG. 11 is a table illustrating an exemplary determination threshold value retained by the parameter storage section according to the embodiment of the operation data collection device of the present invention.

FIG. 12 is a table illustrating the contents of an operation data storage section according to the embodiment of the operation data collection device of the present invention.

BEST MODE FOR CARRYING OUT THE INVENTION

Figure 1:
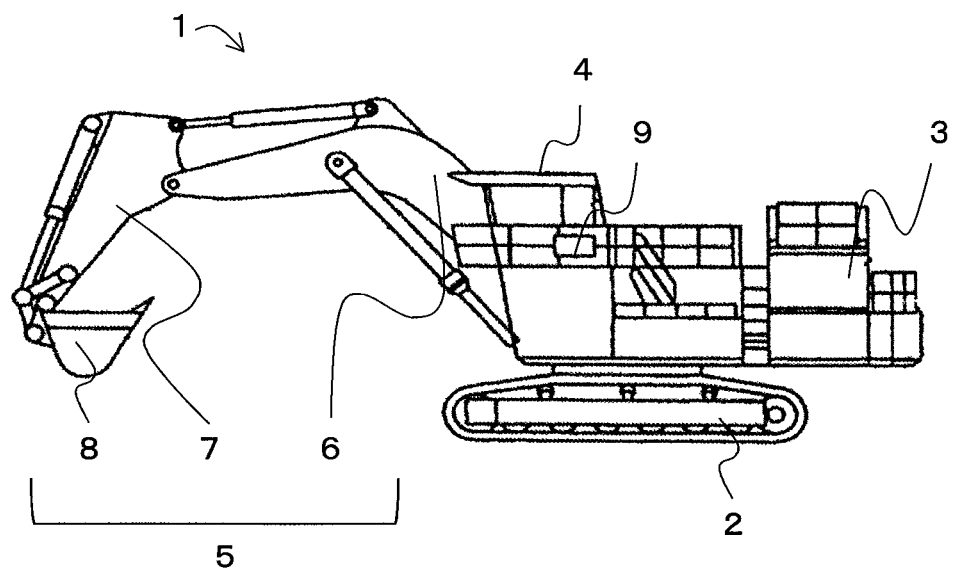
FIG. 1 is a side view illustrating a hydraulic excavator that incorporates an embodiment of an operation data collection device for construction machines in accordance with the present invention.
Figure 2:
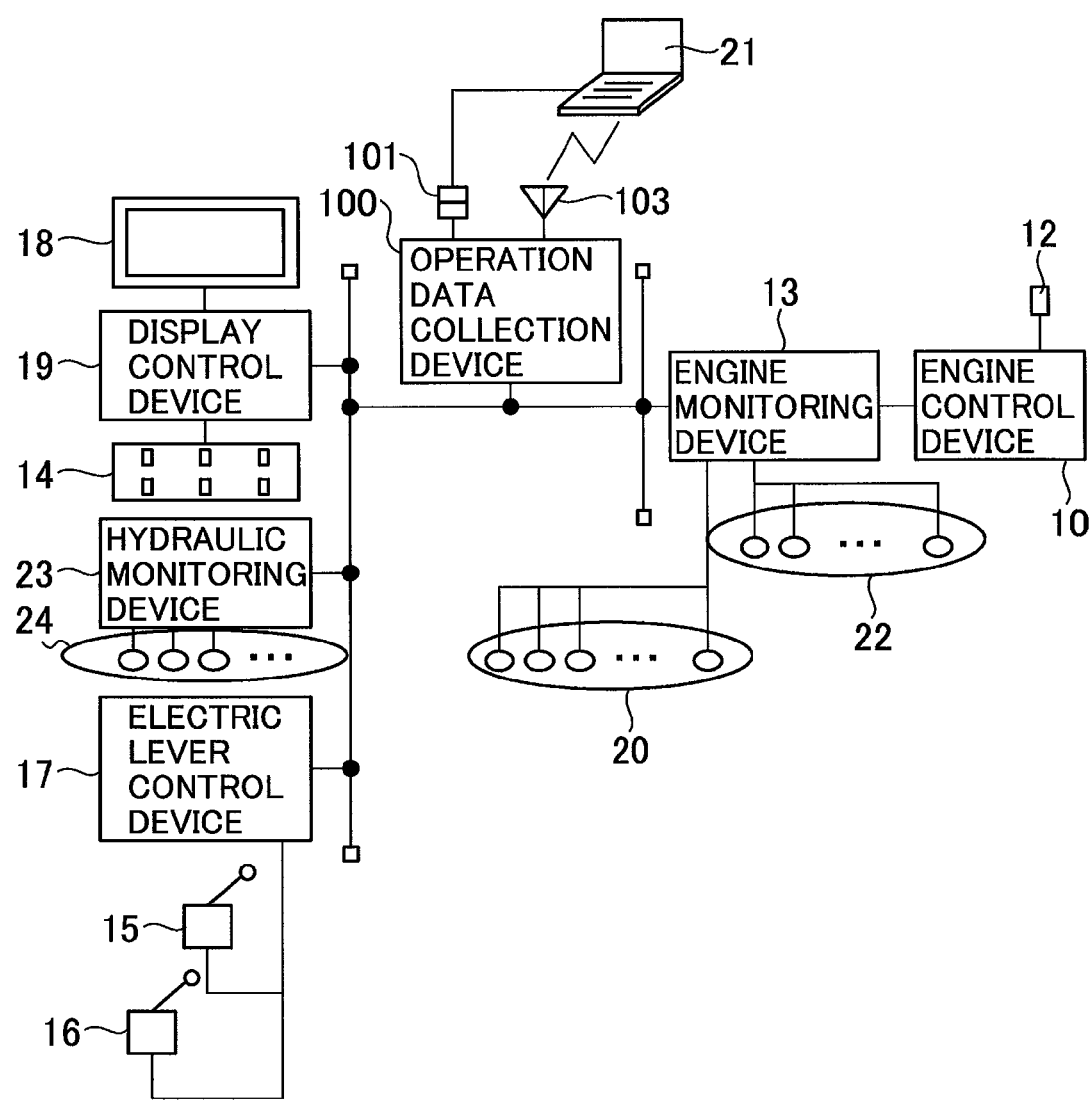
FIG. 2 is a schematic diagram illustrating the configuration of a controller network according to the embodiment of the operation data collection device of the present invention.
Figure 3:
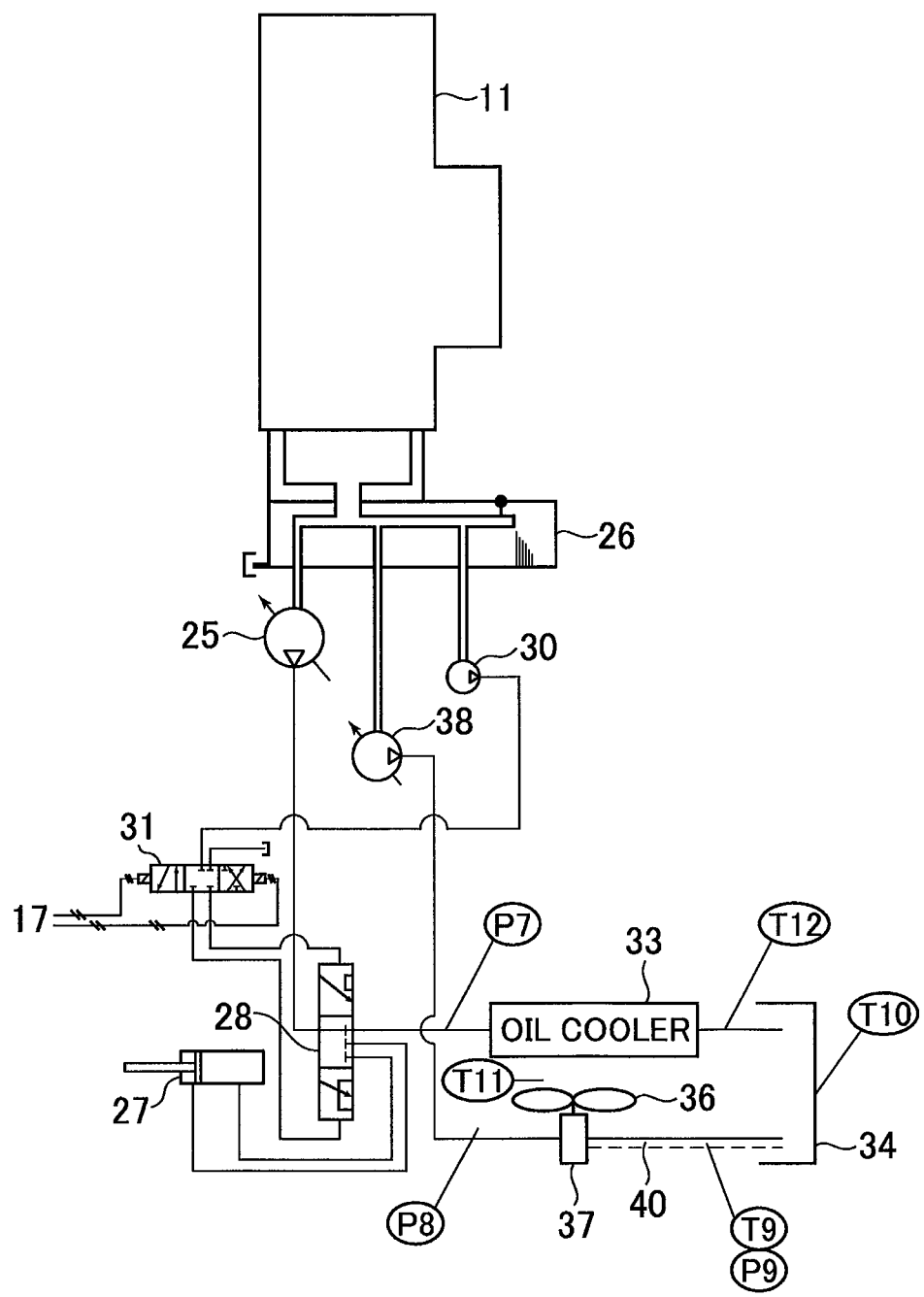
FIG. 3 is a schematic diagram illustrating the overall configuration of a hydraulic fluid cooling system of the hydraulic excavator that incorporates the embodiment of the operation data collection device in accordance with the present invention.
Figure 4:
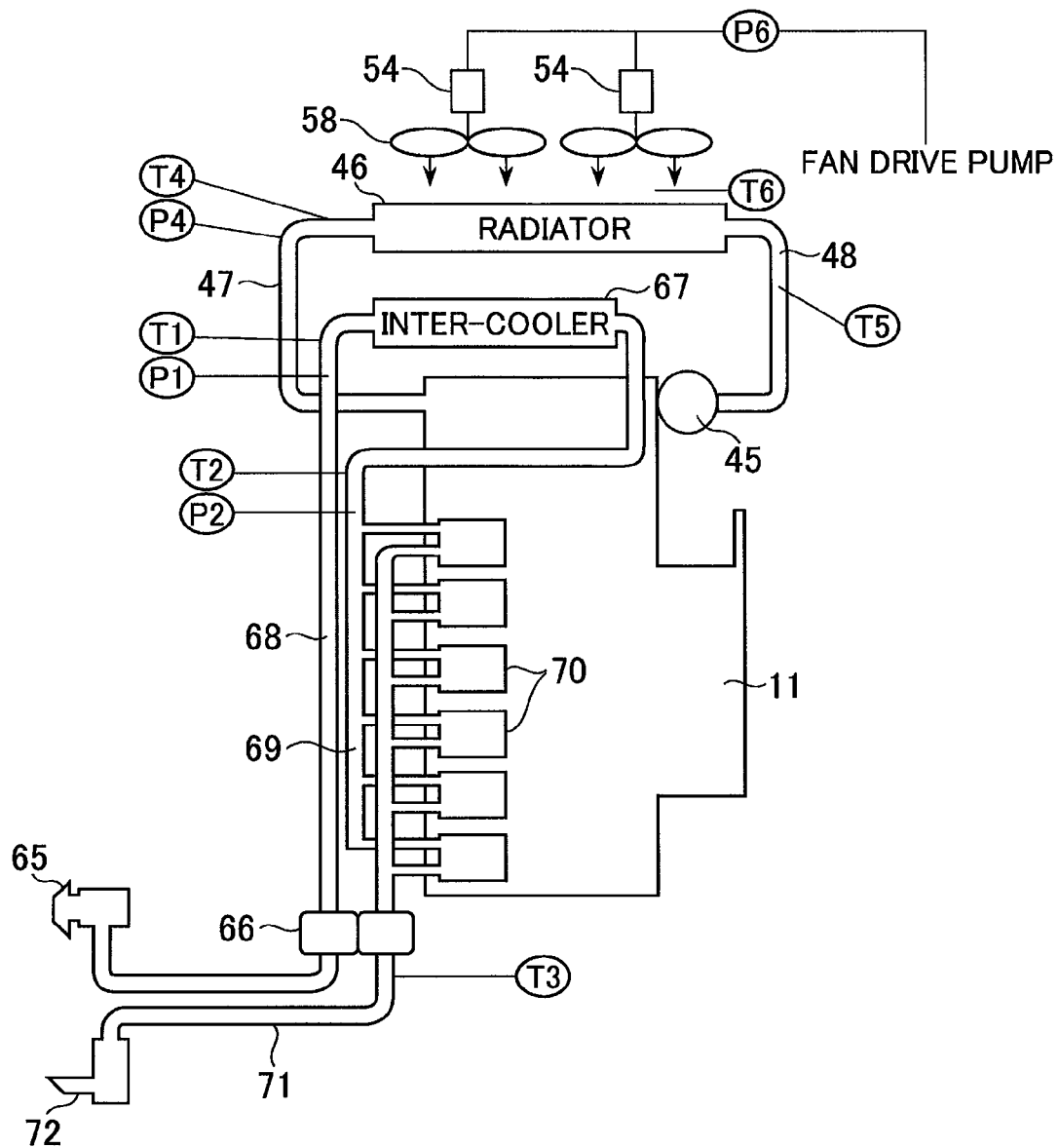
FIG. 4 is a schematic diagram illustrating the overall configuration of an engine cooling water system and intake system of the hydraulic excavator that incorporates the embodiment of the operation data collection device in accordance with the present invention.

An operation data collection device according to an embodiment of the present invention that is used with a construction machine will now be described with reference to the accompanying drawings. The present invention is applicable not only to a hydraulic excavator, but also to various other construction machines such as a crane truck, a wheel loader, and a bulldozer. FIG. 1 is a side view illustrating a hydraulic excavator that incorporates the embodiment of the operation data collection device for construction machines in accordance with the present invention. FIG. 2 is a schematic diagram illustrating the configuration of a controller network according to the embodiment of the operation data collection device of the present invention. FIG. 3 is a schematic diagram illustrating the overall configuration of a hydraulic fluid cooling system of the hydraulic excavator that incorporates the embodiment of the operation data collection device in accordance with the present invention. FIG. 4 is a schematic diagram illustrating the overall configuration of an engine cooling water system and intake system of the hydraulic excavator that incorporates the embodiment of the operation data collection device in accordance with the present invention.

Referring to FIG. 1, the reference numeral 1 denotes a hydraulic excavator which is an extra-large construction machine; the reference numeral 2 denotes a travel structure; the reference numeral 3 denotes a turning structure, which is turnably mounted on the travel structure 2; the reference numeral 4 denotes a cab, which is disposed at the front left of the turning structure 3; and the reference numeral 5 denotes a front work device, which is disposed at the front-center of the turning structure 3. The front work device 5 includes a boom 6, an arm 7, and a bucket 8. The boom 6 is pivotally mounted on the turning structure 3. The arm 7 is pivotally mounted at the leading end of the boom 6. The bucket 8 is mounted at the leading end of the arm 7. A control network 9 is disposed in the cab 4 to collect a status function concerning the operating status of each operating component of the hydraulic excavator 1.

An exemplary configuration of the controller network 9 will now be described with reference to FIG. 2.

As shown in FIG. 2, the controller network 9 includes an engine control device 10, an injection amount control device 12, an engine monitoring device 13, an electric lever 15 for operating the travel structure 2, an electric lever 16 for operating the front work device 5, an electric lever control device 17 for exercising hydraulic control in accordance with the operation amounts of the electric levers (15, 16), a display 18, a display control device 19, a keypad 14, and an operation data collection device 100.

The engine control device 10 controls the injection amount control device 12 to control the amount of fuel injected into an engine 11 (see FIGS. 3 and 4). The engine monitoring device 13 performs monitoring by acquiring status functions concerning the operating status of the engine 11 from various sensors. For example, sensors 20 for sensing the operating status of an intake/exhaust system of the engine 11 and sensors 22 for sensing the operating status of a cooling water system of the engine 11 are connected as sensors for detecting the operating status of the engine 11.

Although described later, the sensors 20 related to the intake/exhaust system of the engine 11 include, for example, various inter-cooler sensors such as an inter-cooler inlet temperature sensor T1 (see FIG. 4), an inter-cooler inlet pressure sensor P1 (see FIG. 4), an inter-cooler outlet temperature sensor T2 (see FIG. 4), an inter-cooler outlet pressure sensor P2 (see FIG. 4), which are installed at the inlet or outlet of an inter-cooler 67 (see FIG. 4) for cooling air to be taken into the engine 11, and an exhaust temperature sensor T3 (see FIG. 4) for detecting the temperature of exhaust from the engine 11.

Although described later, too, the sensors 22 related to the cooling water system of the engine 11 include, for example various radiator sensors such as a radiator inlet temperature sensor T4 (see FIG. 4), a radiator inlet pressure sensor P4 (see FIG. 4), and a radiator outlet temperature sensor T5 (see FIG. 4), which are installed upstream or downstream of a radiator 46 (see FIG. 4) for cooling the cooling water that circulates within the engine.

The engine control device 10 and the engine monitoring device 13 are interconnected with a communication line. The engine monitoring device 13 and the operation data collection device 100 are interconnected through a network line. As the above-described configuration is employed, the status functions concerning the operating status of the intake/exhaust system and cooling water system of the engine 11, which are detected with the various sensors, can be transmitted to the operation data collection device 100.

The display 18 is disposed in the cab 4 to present, for example, various items of operation information and alarm information to an operator. The display control device 19 is connected to the display 18 to control its display operation. The keypad 14 is connected to the display control device 19 to let the operator enter, for example, instructions for setting various data or switching between different screens of the display 18.

A hydraulic monitoring device 23 monitors the status function concerning the operating status of a hydraulic system of the hydraulic excavator 1. Various sensors for detecting the operating status of the hydraulic system are connected to the hydraulic monitoring device 23. For example, sensors 24 for sensing the operating status of the hydraulic fluid cooling system are connected to the hydraulic monitoring device 23. Although described later, the sensors 24 for sensing the operating status of the hydraulic fluid cooling system include, for example, an oil cooler inlet pressure sensor P7 and an oil cooler outlet temperature sensor T12, which are installed at the inlet or outlet of an oil cooler 33 (see FIG. 3) for cooling a hydraulic fluid, and a hydraulic fluid temperature sensor T10 for detecting the temperature of the hydraulic fluid.

The hydraulic monitoring device 23 and the operation data collection device 100 are interconnected through a network line and configured such that the status function concerning the operating status of the hydraulic fluid cooling system, which is detected by the hydraulic monitoring device 23, can also be transmitted to the operation data collection device 100.

The operation data collection device 100 is connected through the network line to the hydraulic monitoring device 23 and to the engine monitoring device 13. The operation data collection device 100 receives, for example, sensor data concerning the operating status of the hydraulic fluid cooling system of the hydraulic system, as well as sensor data concerning the operating status of the intake/exhaust system and cooling water system of the engine 11 from the hydraulic monitoring device 23. The operation data collection device 100 then operates to calculate the deviation of each component system (hydraulic fluid cooling system, intake/exhaust system, cooling water system, etc.) of the engine 11 and hydraulic system from a normal reference value in accordance with the received sensor data, and to record only sensor data that is definitely indicative of abnormality.

The operation data collection device 100 further includes an interface for communicating with the outside. The operation data collection device 100 can be connected, for example, to an external portable terminal 21 through an external communication wired connector 101 or a wireless communication antenna 103 for the purpose of establishing communication so as to transmit accumulated sensor data to the external portable terminal 21.

Referring to FIG. 3, the following describes the overview of the overall configuration of the hydraulic fluid cooling system of the hydraulic system of the hydraulic excavator 1 and the locations of the sensors 24 for sensing the operating status of the hydraulic fluid cooling system.

Referring to FIG. 3, the reference numeral 11 denotes the engine mounted on the turning structure 3 of the hydraulic excavator 1, and the reference numeral 25 denotes a main pump, which is driven by the rotational driving force of a crankshaft (not shown) of the engine 11 through a pump transmission 26. The reference numeral 27 denotes an actuator (e.g., a boom cylinder or an arm cylinder), which is driven by the hydraulic fluid discharged from the main pump 25. The reference numeral 28 denotes a control valve, which is connected to a discharge piping for the main pump 25 in order to control the rate and direction of hydraulic fluid flow from the main pump 25 to the actuator 27.

The reference numeral 30 denotes a pilot pump. The pilot pump 30 is driven by the rotational driving force of the crankshaft of the engine 11 through the pump transmission 26, as is the case with the main pump 25, in order to generate a pilot source pressure for switching-driving the control valve 28. The reference numeral 31 denotes a pilot pressure reducing valve. The pilot pressure reducing valve 31 is connected to a discharge piping for the pilot pump 30 in order to generate a pilot pressure by reducing the pilot source pressure, which is generated by the pilot pump 30, in accordance with a control signal from the electric lever control device 17.

The reference numeral 33 denotes the oil cooler, which is disposed between the control valve 28 and a hydraulic fluid tank 34 to cool the hydraulic fluid. The reference numeral 36 denotes an oil cooler cooling fan, which generates cooling air for cooling the oil cooler 33. The reference numeral 37 denotes an oil cooler fan drive motor, which drives the oil cooler cooling fan 36. The reference numeral 38 denotes an oil cooler fan drive pump. The oil cooler fan drive pump 38 is driven by the rotational driving force of the crankshaft (not shown) of the engine 11 through the pump transmission 26 to supply the hydraulic fluid for driving the oil cooler fan drive motor 37 through a discharge piping. The reference numeral 40 denotes a drain piping for the oil cooler fan drive motor 37.

For the sake of convenience, FIG. 3 shows only one actuator together with a relevant control valve and pilot pressure reducing valve. In reality, however, many actuators are mounted in the hydraulic excavator 1, and control valves, pilot pressure reducing valves, and other hydraulic devices related to the actuators are also provided in the hydraulic excavator 1.

The sensors in the hydraulic fluid cooling system of the hydraulic system, which are shown in FIG. 3, will now be described. Referring to FIG. 3, the reference numeral T10 denotes a hydraulic fluid temperature sensor, which detects the temperature of the hydraulic fluid in the hydraulic fluid tank 34. The reference numeral T11 denotes an oil cooler front temperature sensor, which detects an air temperature in front of the oil cooler cooling fan 36 for the oil cooler 33. The reference numeral T12 denotes an oil cooler outlet temperature sensor, which is disposed in a downstream piping for the oil cooler 33 to detect the temperature of the hydraulic fluid flowing out of the oil cooler 33.

The reference numeral T9 denotes a fan motor drain temperature sensor, which is disposed in the drain piping 40 for the oil cooler fan drive motor 37 to detect the drain temperature of the oil cooler fan drive motor 37. The reference numeral P7 denotes an oil cooler inlet pressure sensor, which is disposed in the upstream piping for the oil cooler 33 to detect the pressure of the hydraulic fluid flowing into the oil cooler 33. The reference numeral P8 denotes a fan motor inlet pressure sensor, which detects the pressure of the hydraulic fluid flowing into the oil cooler fan drive motor 37. The reference numeral P9 denotes a fan motor drain pressure sensor, which is disposed in the drain piping 40 for the oil cooler fan drive motor 37 to detect the drain pressure of the oil cooler fan drive motor 37.

With reference back to FIG. 2, the status functions acquired by use of the sensors 24 for detecting the operating status of the hydraulic fluid cooling system, namely, the hydraulic fluid temperature detected at the hydraulic fluid temperature sensor T10, the oil cooler front temperature detected at the oil cooler front temperature sensor T11, the oil cooler outlet temperature detected at the oil cooler outlet temperature sensor T12, the fan drive motor drain temperature detected at the fan motor drain temperature sensor T9, the oil cooler inlet pressure detected at the oil cooler inlet pressure sensor P7, the fan drive motor inlet pressure detected at the fan motor inlet pressure sensor P8, and the fan drive motor drain pressure detected at the fan motor drain pressure sensor P9, are input to the hydraulic monitoring device 23. The hydraulic monitoring device 23 then transmits the above sensor data (status functions) to the operation data collection device 100 through a network line as sensing data concerning the hydraulic fluid cooling system of the hydraulic system.

Referring to FIG. 4, the following describes the overview of the overall configuration of the cooling water system and intake/exhaust system of the engine 11 and the locations of the sensors 20 and sensors 22 for sensing the operating status of the cooling water system and intake/exhaust system.

First of all, the cooling water system of the engine 11 will be described. With reference to FIG. 4, the reference numeral 45 denotes a cooling water pump, which is driven by the rotational driving force of the crankshaft of the engine 11 through the pump transmission 26. The reference numeral 46 denotes a radiator, which cools the cooling water whose temperature is raised after it is discharged from the cooling water pump 45 to cool the engine 11. The reference numeral 47 denotes a radiator inlet piping connected to the inlet of the radiator 46. The reference numeral 48 denotes a radiator outlet piping connected to the outlet of the radiator 46. The reference numeral 54 denotes a radiator cooling fan drive motor, which is driven by the hydraulic fluid supplied from a fan drive pump (not shown). The reference numeral 58 denotes a radiator cooling fan, which is driven by the radiator cooling fan drive motor 54 to generate an air flow for cooling the radiator 46.

The sensors in the cooling water system of the engine, which are shown in FIG. 4, will now be described. With reference to FIG. 4, the reference numeral T6 denotes a radiator front air temperature sensor, which detects an air temperature nearest the radiator cooling fan drive motor 54 for the radiator 46. The reference numeral T4 denotes a radiator inlet temperature sensor, which is disposed in the radiator inlet piping 47 to detect the temperature of the cooling water flowing into the radiator 46. The reference numeral T5 denotes a radiator outlet temperature sensor, which is disposed in the radiator outlet piping 48 to detect the temperature of the cooling water flowing out of the radiator 46. The reference numeral P4 denotes a radiator inlet pressure sensor, which is disposed in the radiator inlet piping 47 to detect the pressure of the cooling water flowing into the radiator 46. The reference numeral P6 denotes a fan drive motor inlet pressure sensor, which is disposed in an inlet piping for the radiator cooling fan drive motor 54 to detect the pressure of the hydraulic fluid flowing into the radiator cooling fan drive motor 54.

With reference back to FIG. 2, the status functions acquired by use of the sensors 20 for detecting the operating status of the cooling water system of the engine 11, namely, the radiator front air temperature detected at the radiator front air temperature sensor T6, the radiator inlet temperature detected at the radiator inlet temperature sensor T4, the radiator outlet temperature detected at the radiator outlet temperature sensor T5, the radiator inlet pressure detected at the radiator inlet pressure sensor P4, and the fan motor inlet pressure detected at the fan drive motor inlet pressure sensor P6, are input to the engine monitoring device 13. The engine monitoring device 13 then transmits the above sensor data to the operation data collection device 100 through a network line as sensing data concerning the cooling water system of the engine.

The intake/exhaust system of the engine 11 will now be described with reference to FIG. 4. In FIG. 4, the reference numeral 65 denotes an air cleaner, and the reference numeral 66 denotes a turbo device, which compresses air taken in by the air cleaner 65. The reference numeral 67 denotes the inter-cooler, which cools air that is compressed by the turbo device 66 and taken into the engine 11. The reference numeral 68 denotes an inter-cooler inlet piping connected to the inlet of the inter-cooler 67. The reference numeral 69 denotes an inter-cooler outlet piping connected to the outlet of the inter-cooler 67. The reference numeral 70 denotes a plurality of cylinders, which are provided for the engine 11 to take in the air cooled by the inter-cooler 67, mix the air with the fuel, and burn the resulting air-fuel mixture. The reference numeral 71 denotes an exhaust piping that exhausts a combustion gas generated by the cylinders 70. The reference numeral 72 denotes a muffler.

The sensors in the intake/exhaust system of the engine, which are shown in FIG. 4, will now be described. The reference numeral P1 denotes an inter-cooler inlet pressure sensor disposed in the inter-cooler inlet piping 68. The reference numeral T1 denotes an inter-cooler inlet temperature sensor disposed similarly in the inter-cooler inlet piping 68. The reference numeral P2 denotes an inter-cooler outlet pressure sensor disposed in the inter-cooler outlet piping 69. The reference numeral T2 denotes an inter-cooler outlet temperature sensor disposed similarly in the inter-cooler outlet piping 69. The reference numeral T3 denotes an exhaust temperature sensor disposed in the exhaust piping 71.

With reference back to FIG. 2, the status functions acquired by use of the sensors 22 for detecting the operating status of the intake/exhaust system of the engine, namely, the inter-cooler inlet temperature detected at the inter-cooler inlet temperature sensor T1, the inter-cooler inlet pressure detected at the inter-cooler inlet pressure sensor P1, the inter-cooler outlet temperature detected at the inter-cooler outlet temperature sensor T2, the inter-cooler outlet pressure detected at the inter-cooler outlet pressure sensor P2, and the exhaust temperature detected at the exhaust temperature sensor T3 are input to the engine monitoring device 13. The engine monitoring device 13 then transmits the above sensor data to the operation data collection device 100 through a network line as sensing data concerning the intake/exhaust system of the engine 11.

Figures 5, 6:
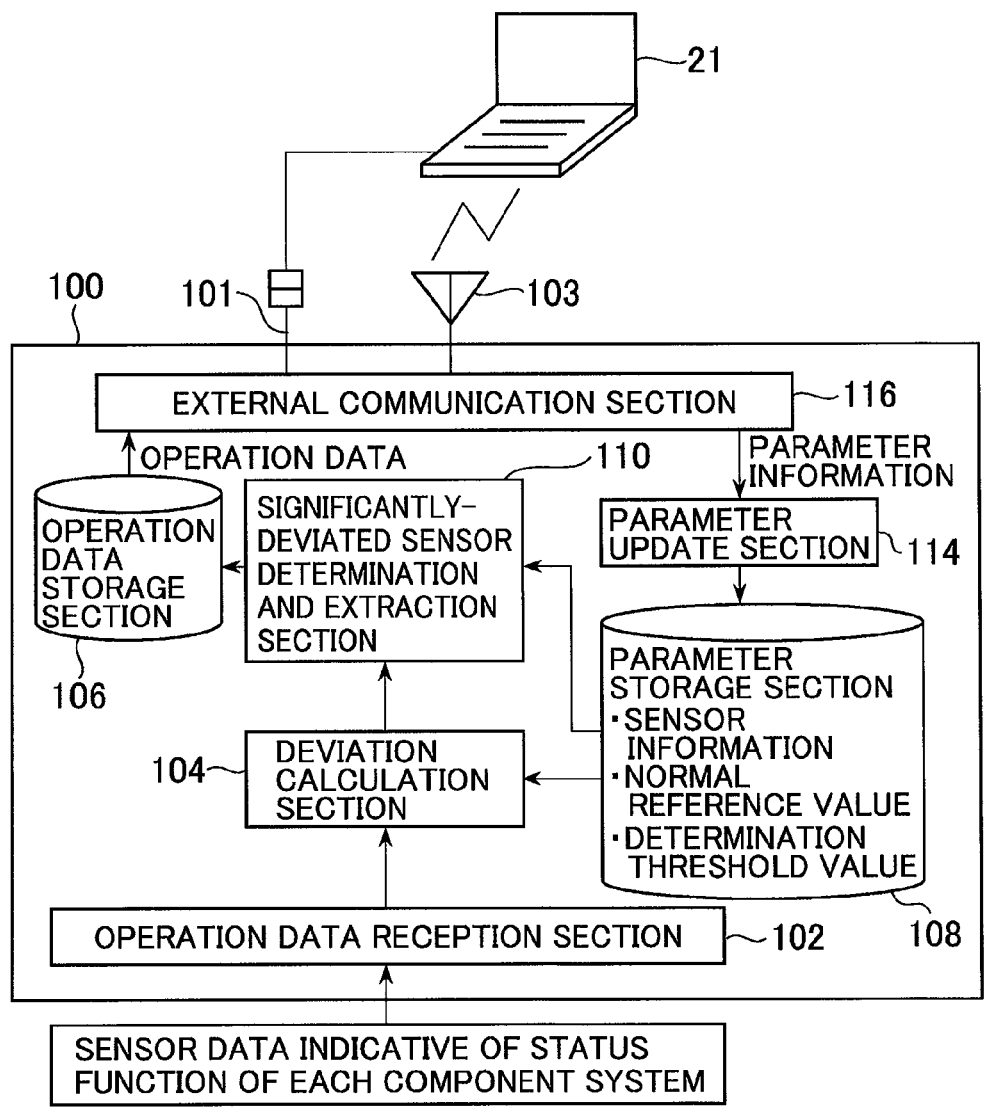
FIG. 5 is a schematic diagram illustrating the configuration of the embodiment of the operation data collection device according to the present invention.
FIG. 6 is a table illustrating an exemplary configuration of sensor data according to the embodiment of the operation data collection device of the present invention.

The configuration of the operation data collection device 100 will now be described with reference to FIG. 5. FIG. 5 is a schematic diagram illustrating the configuration of the embodiment of the operation data collection device according to the present invention.

The operation data collection device 100 according to the present invention includes a sensor assembly for each component system, and stores a relevant sensor list and a normal reference value for each sensor data per operating mode in order to detect an abnormality in each of the component systems such as the engine cooling water system, engine intake system, and hydraulic fluid cooling system. The operation data collection device 100 first calculates the deviation of each component system in accordance with the normal reference value and sensor data to determine abnormality on an overall basis. The operation data collection device 100 then operates in accordance with the deviation of each component system from normality. More specifically, the operation data collection device 100 sequentially stores N pieces of sensor data exhibiting the greatest to the N-th greatest deviations from the normal reference value. This makes it possible to extract and store only sensor data likely to contribute to abnormality in accordance with an overall abnormality of each component system. The amount of information to be stored therefore can be reduced without quality loss of information used for maintenance.

As shown in FIG. 5, the operation data collection device 100 includes an operation data reception section 102, a deviation calculation section 104, an operation data storage section 106, a parameter storage section 108 serving as a normal reference value storage section, a sensor with top greatest deviation determination and extraction section 110 serving as a stored sensor item extraction section, a parameter update section 114, and an external communication section 116.

The operation data reception section 102 receives various sensor data, which are handled as the status functions of individual component systems, from the engine monitoring device 13 (see FIG. 2) and hydraulic monitoring device 23 (see FIG. 2) to which the operation data reception section 102 is connected through a communication line.

The parameter storage section 108 stores sensor information for detecting the status functions of individual component systems such as the hydraulic fluid cooling system and engine cooling water system, information on the normal reference value for each sensor data, and information on a determination threshold value that is used in the sensor with top greatest deviation determination and extraction section 110 to determine whether to store data in the operation data storage section 106.

The deviation calculation section 104 calculates the deviation of sensor data received by the operation data reception section 102 from the normal reference value stored in the parameter storage section 108 every time interval $\Delta T$. The time interval $\Delta T$ is measured at the deviation calculation section 104 on the basis of an internal clock (not shown) of the operation data collection device 100 and set by a time interval setup device (not shown), which permits the time interval $\Delta T$ to be set from the outside.

The sensor with top greatest deviation determination and extraction section 110 determines and extracts sensors significantly deviated from the normal reference value in accordance with the deviation measured at the deviation calculation section 104 and with the information on the determination threshold value stored in the parameter storage section 108 in order to store data on the extracted sensors in the operation data storage section 106.

The external communication section 116 establishes wired or wireless communication with the external portable terminal 21 through the external communication wired connector 101 or the wireless communication antenna 103, transmits the operation data stored in the operation data storage section 106 to the portable terminal 21, receives an update parameter from the portable terminal 21, and outputs the update parameter to the parameter update section 114.

The parameter update section 114 performs a process of updating the contents of the parameter storage section 108 in accordance with the update parameter information received from the portable terminal through the external communication section 116.

Figures 9, 10:
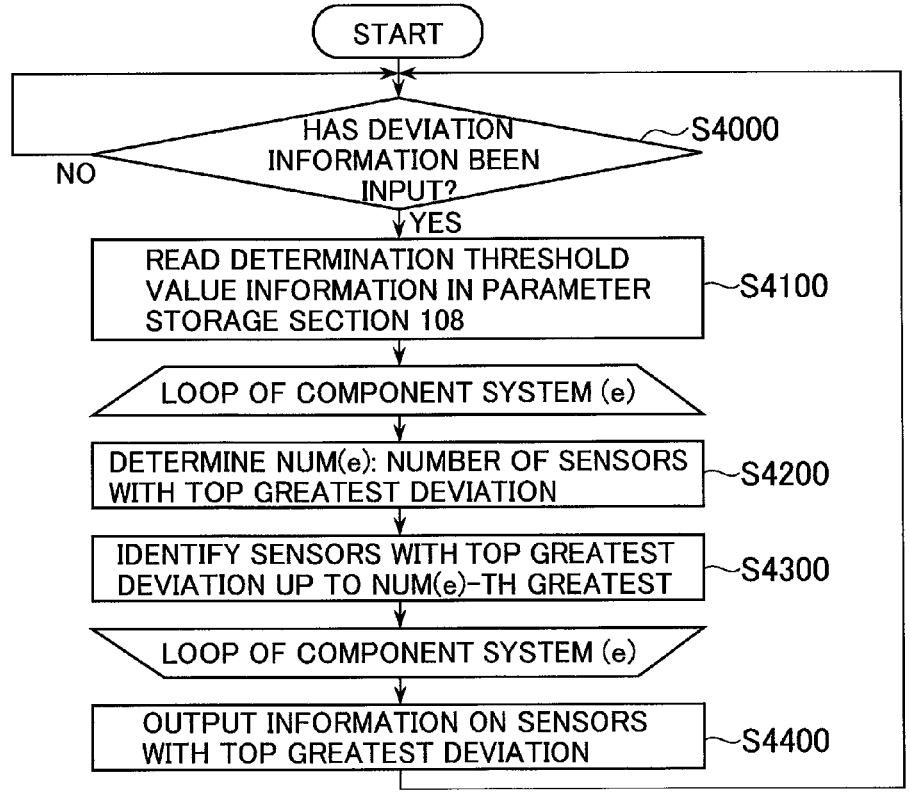
FIG. 9 is a table illustrating an example of normal reference value information retained by the parameter storage section according to the embodiment of the operation data collection device of the present invention.
FIG. 10 is a flowchart illustrating a process performed by a sensor with top greatest deviation determination and extraction section according to the embodiment of the operation data collection device of the present invention.

Various sections of the operation data collection device 100 will now be described in detail with reference to the accompanying drawings. FIG. 6 is a table illustrating an exemplary configuration of sensor data according to the embodiment of the operation data collection device of the present invention. FIG. 7 is a flowchart illustrating a process performed by the deviation calculation section according to the embodiment of the operation data collection device of the present invention. FIG. 8 is a table illustrating an example of sensor information retained by the parameter storage section according to the embodiment of the operation data collection device of the present invention. FIG. 9 is a table illustrating an example of normal reference value information retained by the parameter storage section according to the embodiment of the operation data collection device of the present invention. FIG. 10 is a flowchart illustrating a process performed by the sensor with top greatest deviation determination and extraction section according to the embodiment of the operation data collection device of the present invention. FIG. 11 is a table illustrating an exemplary determination threshold value retained by the parameter storage section according to the embodiment of the operation data collection device of the present invention. FIG. 12 is a table illustrating the contents of the operation data storage section according to the embodiment of the operation data collection device of the present invention.

The operation data reception section 102 receives the sensor data detected at the sensors 20 and sensors 22 in the cooling water system and intake/exhaust system of the engine 11 from the engine monitoring device 13 (see FIG. 2), which is connected to the operation data reception section 102 through a communication line, and receives the sensor data detected at the sensors 24 in the hydraulic fluid cooling system of the hydraulic system from the hydraulic monitoring device 23 (see FIG. 2), which is similarly connected to the operation data reception section 102 through a communication line. The operation data reception section 102 then outputs the received sensor data to the deviation calculation section 104 as shown in FIG. 5.

FIG. 6 shows an exemplary configuration of sensor data for each time the data is received by the operation data reception section 102. As shown in FIG. 6, the sensor data includes a reception date for each time and a plurality of sensor records. The reception date and time are measured by use of the aforementioned internal clock (not shown) of the operation data collection device 100 and indicative of a date and time at which the plurality of sensor records are received.

Each sensor record includes, for example, a component system ID, a sensor ID, and a sensor value. The component system ID is an ID for specifying, for example, the cooling water system, intake system, or exhaust system of the engine or the hydraulic fluid cooling system of the hydraulic system. The sensor ID, which is a sensor item, is a unique ID assigned to each sensor. A combination of the component system ID and sensor ID indicates what sensor in a heavy machine is the source of the sensor value.

The process performed by the deviation calculation section 104 of the operation data collection device 100 will now be described with reference to FIG. 7.

First of all, the deviation calculation section 104 in step S2000 checks whether sensor data has been input from the operation data reception section 102. If no sensor data has been input, the query in step S2000 is answered "NO" and the processing returns to step S2000 to wait for the input of sensor data. When sensor data is input from the operation data reception section 102, the query in step S2000 is answered "YES" and the processing goes to step S2050.

In step S2050, the deviation calculation section 104 reads sensor information stored in the parameter storage section 108 and extracts the sensor data to be handled subsequently.

FIG. 8 shows the sensor information stored in the parameter storage section 108. The sensor information includes a table for interpreting the sensor data received by the operation data reception section 102. More specifically, the sensor information includes the ID of a component system to be subjected to deviation calculation, the ID of a sensor included in the component system, and the unit of data acquired by the sensor. The deviation calculation section 104 compares the combination of a component system ID and a sensor ID in each sensor record of the sensor data received from the operation data reception section 102 with the contents of the sensor information, and extracts only a sensor record that agrees with the sensor information in the ID combination.

With reference back to FIG. 7, in step S2100, the deviation calculation section 104 reads the normal reference value information stored in the parameter storage section 108.

FIG. 9 shows the details of the normal reference value information stored in the parameter storage section 108. As shown in FIG. 9, the stored normal reference value information includes the normal reference values of individual component systems such as the engine cooling water system, engine intake system, engine exhaust system, and hydraulic fluid cooling system. Each sensor's normal average and normal variance, which vary with the operating mode, are stored as the normal reference values for the individual component systems.

The operating mode is a unit defined when data is classified according to an engine load factor and engine rotation speed. From the viewpoint of numerical analysis, statistical classification can be achieved through a cluster analysis or other process on sensor data previously acquired during a normal operation. If, for instance, individual time data previously acquired during a normal operation are plotted in an N-dimensional space while a combination of N pieces of sensor data is defined as a vector of N elements, sensor data in the same operating mode generally tend to be assembled at nearby locations and consolidated. These characteristics are utilized to calculate the average and variance of N pieces of sensor data with respect to a data group assembled and consolidated in each operating mode and store the calculated values in advance as the normal reference values.

As for the engine intake system, for example, the average and variance of the inter-cooler inlet temperature (T1), inter-cooler inlet pressure (P1), inter-cooler outlet temperature (T2), and inter-cooler outlet pressure (P2) are calculated and stored with respect to operating modes 1 to M. As for the other component systems, the average and variance of the sensor data of sensors 1 to N are also calculated and stored with respect to operating modes 1 to M.

With reference back to FIG. 7, in step S2200, the deviation calculation section 104 calculates the deviation of each component system in each operating mode. When the component system is e, the operating mode is m, the deviation of the component system e in the operating mode m is L(e,m), the number of sensors included in the component system e is N, and sensor values acquired at time t are $d_1(t), d_2(t), \ldots, d_N(t)$, Equation 1 below is used to calculate the value L(e,m):

$$L(e, m) = \sqrt{\sum_{i=1}^{N} \left(\frac{d_i(t) - \mu_{mi}}{\sigma_{mi}}\right)^2} \quad \text{(Equation 1)}$$

The symbols $\mu_{mi}$ and $\sigma_{mi}$ respectively represent the normal average and normal variance of a sensor i in the operating mode m.

In step S2300, the deviation calculation section 104 performs an operating mode determination process on each component system. In step S2300, the deviations L(e,m) (m=1, 2, ..., M) in M different operating modes, which are calculated in step S2200, are compared, and a mode m=m(e) in which the deviation is smallest is determined as the operating mode of a target component system e. In other words, the operating mode determination process performed in step S2300 corresponds to a process of calculating the distance between sensor data and the normal reference value of each operating mode and detecting an operating mode in which the distance is minimized.

In step S2400, the deviation calculation section 104 prepares deviation information on each component system and outputs the deviation information to the sensor with top greatest deviation determination and extraction section 110.

The information to be output in step S2400 includes time t, the determined operating mode m(e) of each component system e (e=1, 2, . . . , E), the deviation L[e,m(e)], sensor values $d_1(t), d_2(t), \ldots, d_N(t)$, and the deviations of the individual sensor values $\{[d_i(t)-\mu_{m(e)i}/\sigma_{m(e)i}]^2$ (i=1, 2, . . . , N).

Upon completion of step S2400, the deviation calculation section 104 returns to step S2000 and enters operation data at time t+1 after the aforementioned time interval ΔT.

The process performed by the sensor with top greatest deviation determination and extraction section 110 of the operation data collection device 100 will now be described with reference to FIG. 10.

First of all, in step S4000, the sensor with top greatest deviation determination and extraction section 110 confirms whether the deviation information has been input from the deviation calculation section 104. If no deviation information has been input, the query in step S4000 is answered "NO" and the processing returns to step S4000 to wait for the input of the deviation information. When the deviation information is input from the deviation calculation section 104, the query in step S4000 is answered "YES" and the processing goes to step S4100.

In step S4100, the sensor with top greatest deviation determination and extraction section 110 reads determination threshold value information in the parameter storage section 108.

FIG. 11 shows the details of the determination threshold value information stored in the parameter storage section 108. The determination threshold value information is organized in the form of a table that indicates the relationship between a deviation range and the number of sensors with top greatest sensors to be extracted. If, for example, the deviation L[e,m (e)] is smaller than 1, it is conceivable that the sensor data on the component system e is within the variation range of a normal value. Therefore, the number of sensors to be acquired is configured to be zero, and the number of sensors to be extracted is configured to increase as the deviation L[e,m(e)] becomes larger.

The determination threshold value information can be changed in accordance with an update instruction from the portable terminal 21 through the parameter update section 114 included in the configuration of the operation data collection device 100 shown in FIG. 5. Therefore, when, for instance, the number of sensors is set to be "ALL" with respect to a deviation range of 'L≥0', the resulting determination threshold value information is such that all sensor data is to be extracted.

With reference back to FIG. 10, in step S4200, the sensor with top greatest deviation determination and extraction section 110 determines NUM(e), the number of sensors with top greatest sensors, in each component system. In other words, the rank of deviation L[e,m(e)] in the component system e is identified within each deviation L range of the determination threshold value information, and the number of sensors with top greatest sensors NUM(e) belonging to the identified rank is determined.

In step S4300, the sensor with top greatest deviation determination and extraction section 110 identifies sensors with top greatest deviation up to NUM(e)-th greatest. More specifically, the deviation information input from the deviation calculation section 104 is examined to compare the deviations $\{[d_i(t)-\mu_{m(e)i}/\sigma_{m(e)i}]^2$ (i=1, 2, . . . , N) of the individual sensors for the purpose of identifying the sensors with top greatest deviation up to NUM(e)-th greatest. These sensors correspond to the sensors with top greatest deviation that has been extracted.

In step S4400, the sensor with top greatest deviation determination and extraction section 110 performs output operation based on the information on the sensors identified in step S4300 to the operation data storage section 106.

FIG. 12 shows the details of exemplary information stored in the operation data storage section 106. The operation data storage section 106 stores two types of information: management information and sensor data. The stored management information includes various items of information on a heavy machine in which the operation data collection device 100 is mounted, namely, a model number, a unit number, a PIN (personal identification number), a country code, and a site ID. The model number, unit number, and PIN are unique information for identification of the heavy machine. The country code and site ID are information for identifying a country and mine in which the heavy machine operates. The information on the above code and ID is used for sensor data management purposes and added to sensor data when it is transmitted to a management system through the portable terminal 21, which makes it possible to identify particular sensor data of a particular heavy machine.

Meanwhile, the sensor data corresponds to information that is output from the sensor with top greatest deviation determination and extraction section 110 in step S4400. The sensor data is managed on a time basis and divided into information on a reception date and time and sensor record information on each component system. The sensor record information on each component system includes a component system ID, the deviation L, and the number NUM of sensors with top greatest deviation, as well as the sensor IDs and sensor values of the greatest up to NUM-th greatest. The component system ID is the same as the ID included in the sensor information in the parameter storage section 108.

With reference back to FIG. 10, upon completion of step S4400, the sensor with top greatest deviation determination and extraction section 110 returns to step S4000 and checks the input of the deviation information for the next time.

As described above, the operation data collection device 100 extracts only sensor data concerning abnormality data indicative of an impending failure from the sensor data derived from a heavy machine and stores the extracted sensor data in the operation data storage section 106. In compliance with a request from the external portable terminal 21, the external communication section 116 transmits the sensor data stored in the operation data storage section 106 through the external communication wired connector 101 or the wireless communication antenna 103.

An operation performed in the embodiment of the operation data collection device of the present invention, which has the above-described configuration, will now be described.

The operation data collection device 100 according to the present invention includes a sensor assembly for each component system, and stores a relevant sensor list and a normal reference value for each sensor data per operating mode in order to detect an abnormality in each of the component systems such as the engine cooling water system, engine intake system, and hydraulic fluid cooling system. The operation data collection device 100 first calculates the deviation of each component system in accordance with the normal reference value and sensor data to determine abnormality on an overall basis. The operation data collection device 100 then operates in accordance with the deviation of each component system from normality. More specifically, the operation data collection device 100 sequentially stores N pieces of sensor data exhibiting the greatest to the N-th greatest deviations from the normal reference value.

If, for instance, the sensor data of the oil cooler inlet pressure sensor P7 in the hydraulic fluid cooling system of a construction machine significantly deviates from the normal reference value for some reason, the operation data collection device 100 causes the deviation calculation section 104 to output the deviation information on the hydraulic fluid cooling system to the sensor with top greatest deviation determination and extraction section 110. The sensor with top greatest deviation determination and extraction section 110 reads the determination threshold value information in the parameter storage section 108, determines the number of sensors to be extracted in accordance with the deviation L, and determines the number of sensors with top greatest sensors in the hydraulic fluid cooling system. If, for instance, the deviation is 1 or greater but smaller than 2, two significantly deviated sensors are identified. As a result, the operation data storage section 106 stores the sensor data of the oil cooler inlet pressure sensor P7 in the hydraulic fluid cooling system and the sensor data of the oil fan motor inlet pressure sensor P8, oil cooler fan motor drain temperature sensor T9, oil cooler fan motor drain pressure sensor P9, hydraulic fluid temperature sensor T10, oil cooler front temperature sensor T11, or oil cooler outlet temperature sensor T12 that exhibits the second greatest deviation from the normal reference value.

As described above, the present embodiment monitors the entire sensor assembly of each component system of the construction machine and stores only the data of a plurality of significantly deviated sensors in accordance with the deviation from the normal reference value. Therefore, each time an abnormality indicative of an impending failure occurs, the operation data collection device 100 records relevant sensor data. The recording as a result makes it possible to surely predict a failure of a construction machine. Further, the present embodiment stores only data of a plurality of significantly deviated sensors in accordance with the deviation, and the amount of information to be stored can be greatly reduced without degrading the quality of information used for maintenance.

The above-described embodiment of the operation data collection device of the present invention can reduce the amount of information to be collected and stored while maintaining the quality of information used for maintenance. Operation data indicative of an impending failure of a construction machine therefore can be efficiently collected. The embodiment as a result makes it possible to precisely prevent a failure that obstructs continuous operations, leading to an increase in the productivity of the construction machine.

The operation of the present embodiment has been described in relation to the hydraulic fluid cooling system of a construction machine. However, the present embodiment performs the same operation in relation, for instance, to the cooling water system and intake/exhaust system of the engine of the construction machine.

REFERENCE NUMERALS

1 . . . Hydraulic excavator
2 . . . Travel structure
3 . . . Turning structure
4 . . . Cab
5 . . . Front work device
9 . . . Controller network
10 . . . Engine control device
11 . . . Engine
12 . . . Injection amount control device
13 . . . Engine monitoring device
20 . . . Engine intake/exhaust system sensors
21 . . . Portable terminal
22 . . . Engine cooling water system sensors
23 . . . Hydraulic monitoring device
25 . . . Main pump
28 . . . Control valve
30 . . . Pilot pump
100 . . . Operation data collection device
101 . . . External communication wired connector
102 . . . Operation data reception section
103 . . . Wireless communication antenna
104 . . . Deviation calculation section
106 . . . Operation data storage section
108 . . . Parameter storage section
110 . . . Sensor with top greatest deviation determination and extraction section
114 . . . Parameter update section
116 . . . External communication section
T1 . . . Inter-cooler inlet temperature sensor
T2 . . . Inter-cooler outlet temperature sensor
P1 . . . Inter-cooler inlet pressure sensor
P2 . . . Inter-cooler outlet pressure sensor
T4 . . . Radiator inlet temperature sensor
T5 . . . Radiator outlet temperature sensor
T6 . . . Radiator front air temperature sensor
P4 . . . Radiator inlet pressure sensor
P6 . . . Fan drive motor inlet pressure sensor
T9 . . . Oil cooler fan motor drain temperature sensor
T10 . . . Hydraulic fluid temperature sensor
T11 . . . Oil cooler front temperature sensor
T12 . . . Oil cooler outlet temperature sensor
P7 . . . Oil cooler inlet pressure sensor
P8 . . . Oil fan motor inlet pressure sensor
P9 . . . Oil cooler fan motor drain pressure sensor

The invention claimed is:

1. An operation data collection device for a construction machine, where the operation data collection device is mounted on the construction machine, the operation data collection device receives operation data containing a plurality of values indicative of an operating state of the construction machine and stores the operation data in an operation data storage section, the values being measured by a plurality of sensors of the construction machine, the operation data collection device comprising:

a normal reference value storage section that stores a plurality of normal reference values for each of the sensors generating the operation data;

a deviation calculation section that calculates deviations of the respective values of the operation data generated by each of the sensors with relation to the respective normal reference values; and a stored sensor item extraction section that extracts and stores sensor items of the operation data in the operation data storage section according to the calculated deviations of the operation data for each of the sensors, wherein the stored sensor item extraction section compares the deviations of each of the sensors with relation to the normal reference values, sequentially selects the sensors from the sensor items in order from greatest deviation to smallest deviation, and stores information on the selected sensors in the operation data storage section, wherein the sensors are classified into a plurality of sensor assemblies in accordance with sensor properties of the sensors, wherein the deviation calculation section calculates a deviation aggregate of each of the sensor assemblies in accordance with the deviations of each of the sensors thereof, wherein the deviation calculation section includes a sensor item count determination threshold value storage section for storing sensor item count determination threshold value information indicative of a relationship between the deviation aggregate of each of the sensor assemblies and a number of the sensor items of operation data to be selected by the stored sensor item extraction section and stored in the operation data storage section, and wherein the stored sensor item extraction section determines the number of the sensor items of the operation data to be stored in the operation data storage section in accordance with the sensor item count determination threshold value information and the respective deviation aggregate of each of the sensor assemblies.

2. The operation data collection device according to claim 1, wherein the deviation calculation section classifies the sensors into the sensor assemblies according to a respective component of the construction machine on which each of the sensors are mounted or according to a respective system of the construction machine to which each of the sensors belong.

3. The operation data collection device according to claim 2, wherein
the deviation calculation section classifies the sensors into the sensor assemblies according to a respective component system of the construction machine to which each of the sensors belong, and
the component systems include at least one of an engine cooling water system, an engine intake system, an engine exhaust system, an engine oil system, and a hydraulic fluid cooling system.

4. The operation data collection device according to claim 3, wherein the sensors of one of the sensor assemblies whose component system is the engine cooling water system include one or more of an inter-cooler inlet temperature sensor, an inter-cooler inlet pressure sensor, an inter-cooler outlet temperature sensor, and an inter-cooler outlet pressure sensor.

5. The operation data collection device according to claim 3, wherein the sensors of one of the sensor assemblies whose component system is the hydraulic fluid cooling system include one or more of an oil cooler inlet pressure sensor, an oil fan motor inlet pressure sensor, an oil cooler fan motor drain temperature sensor, an oil cooler fan motor drain pressure sensor, a hydraulic fluid temperature sensor, an oil cooler front temperature sensor, and an oil cooler outlet temperature sensor.

6. The operation data collection device according to claim 3, wherein the sensors of one of the sensor assemblies whose component system is the engine cooling water system include one or more of a radiator inlet temperature sensor, a radiator inlet pressure sensor, a radiator outlet temperature sensor, a radiator front air temperature sensor, and a fan drive motor inlet pressure sensor.

7. An operation data collection device for a construction machine, where the operation data collection device is mounted on the construction machine, the operation data collection device receives operation data containing a plurality of values indicative of an operating state of the construction machine and stores the operation data in an operation data storage section, the values being measured by a plurality of sensors of the construction machine, the operation data collection device comprising:

a normal reference value storage section that stores a plurality of normal reference values for each of the sensors generating the operation data;

a deviation calculation section that calculates deviations of the respective values of the operation data generated by each of the sensors with relation to the respective normal reference values; and a stored sensor item extraction section that extracts and stores sensor items of the operation data in the operation data storage section according to the calculated deviations of the operation data for each of the sensors, wherein an average and a variance of the values acquired by the sensors are stored as the normal reference values in the normal reference value storage section, wherein the sensors are classified into a plurality of sensor assemblies in accordance with sensor properties of the sensors, wherein the deviation calculation section calculates a deviation aggregate of each of the sensor assemblies in accordance with the deviations of each of the sensors thereof;

wherein the deviation calculation section includes a sensor item count determination threshold value storage section for storing sensor item count determination threshold value information indicative of a relationship between the deviation aggregate of each of the sensor assemblies and a number of the sensor items of operation data to be selected by the stored sensor item extraction section and stored in the operation data storage section, and wherein the stored sensor item extraction section determines the number of the sensor items of the operation data to be stored in the operation data storage section in accordance with the sensor item count determination threshold value information and the respective deviation aggregate of each of the sensor assemblies.

8. The operation data collection device according to claim 7, wherein the deviation calculation section classifies the sensors into the sensor assemblies according to a respective component of the construction machine on which each of the sensors are mounted or according to a respective system of the construction machine to which each of the sensors belong.

9. The operation data collection device according to claim 8, wherein
the deviation calculation section classifies the sensors into the sensor assemblies according to a respective component system of the construction machine to which each of the sensors belong, and
the component systems include at least one of an engine cooling water system, an engine intake system, an engine exhaust system, an engine oil system, and a hydraulic fluid cooling system.

10. The operation data collection device according to claim 9, wherein the sensors of one of the sensor assemblies whose component system is the engine cooling water system include one or more of an inter-cooler inlet temperature sensor, an inter-cooler inlet pressure sensor, an inter-cooler outlet temperature sensor, and an inter-cooler outlet pressure sensor.

11. The operation data collection device according to claim 9, wherein the sensors of one of the sensor assemblies whose component system is the hydraulic fluid cooling system include one or more of an oil cooler inlet pressure sensor, an oil fan motor inlet pressure sensor, an oil cooler fan motor drain temperature sensor, an oil cooler fan motor drain pressure sensor, a hydraulic fluid temperature sensor, an oil cooler front temperature sensor, and an oil cooler outlet temperature sensor.

12. The operation data collection device according to claim 9, wherein the sensors of one of the sensor assemblies whose component system is the engine cooling water system include one or more of a radiator inlet temperature sensor, a radiator inlet pressure sensor, a radiator outlet temperature sensor, a radiator front air temperature sensor, and a fan drive motor inlet pressure sensor.

* * * * *